United States Patent [19]

Pappanikolaou

[11] Patent Number: 4,885,907
[45] Date of Patent: Dec. 12, 1989

[54] CHAINBAR

[76] Inventor: Sofia Pappanikolaou, 621 90th St., Brooklyn, N.Y. 11228

[21] Appl. No.: 276,131

[22] Filed: Nov. 25, 1988

[51] Int. Cl.⁴ .............................................. F16G 13/18
[52] U.S. Cl. ........................................... 59/78; 59/84; 59/93
[58] Field of Search .................. 59/78, 78.1, 84, 4, 59/82, 93, 89, 87, 95, 80; 474/219, 220, 224, 229

[56] References Cited

U.S. PATENT DOCUMENTS

| | | | |
|---|---|---|---|
| 774,470 | 11/1904 | Hamilton et al. | 59/84 |
| 1,004,575 | 10/1911 | Jones | 59/78 |
| 2,362,383 | 11/1944 | Lendinara | 59/78 |
| 2,417,141 | 3/1947 | Syfert | 59/78 |
| 3,027,201 | 3/1962 | Blazek et al. | 474/224 |
| 3,309,864 | 3/1967 | Arndt et al. | 474/224 |
| 4,658,577 | 4/1987 | Klein | 59/78.1 |

Primary Examiner—David Jones

[57] ABSTRACT

The invention is called a "Chainbar" because it may be quickly and easily adjusted to have the characteristics of a flexible chain and/or that of a rigid bar; and may be easily folded into any size rectangular solid of equal volume. It consists of a series of interconnected links, which are flexible like a chain, but have means for restricting the movement between the links, to form a rigid bar. If the Chainbar is in the form of a flexible chain, and is passed through a tube which may be less than one link long, and has proper activating tabs, the movement between links will be sequentially restricted to form a rigid bar, adjustable in length in one link increments. The Chainbar has ubiquitous uses. It may anchored at one end and have a device attached to the other end, that may be extended out and away from the anchored end, such as a mirror, microphone, light source, etc. It may be used as folding handles or legs in folding, compact items such as tables, tripods, luggage carriers, etc. It may have hook holes along its bottom edge from which items such as curtains, flags, signs, etc. may be hung. It may also be used in the place of a rigid bar, such as a broom handle, between two supports, etc.

6 Claims, 1 Drawing Sheet

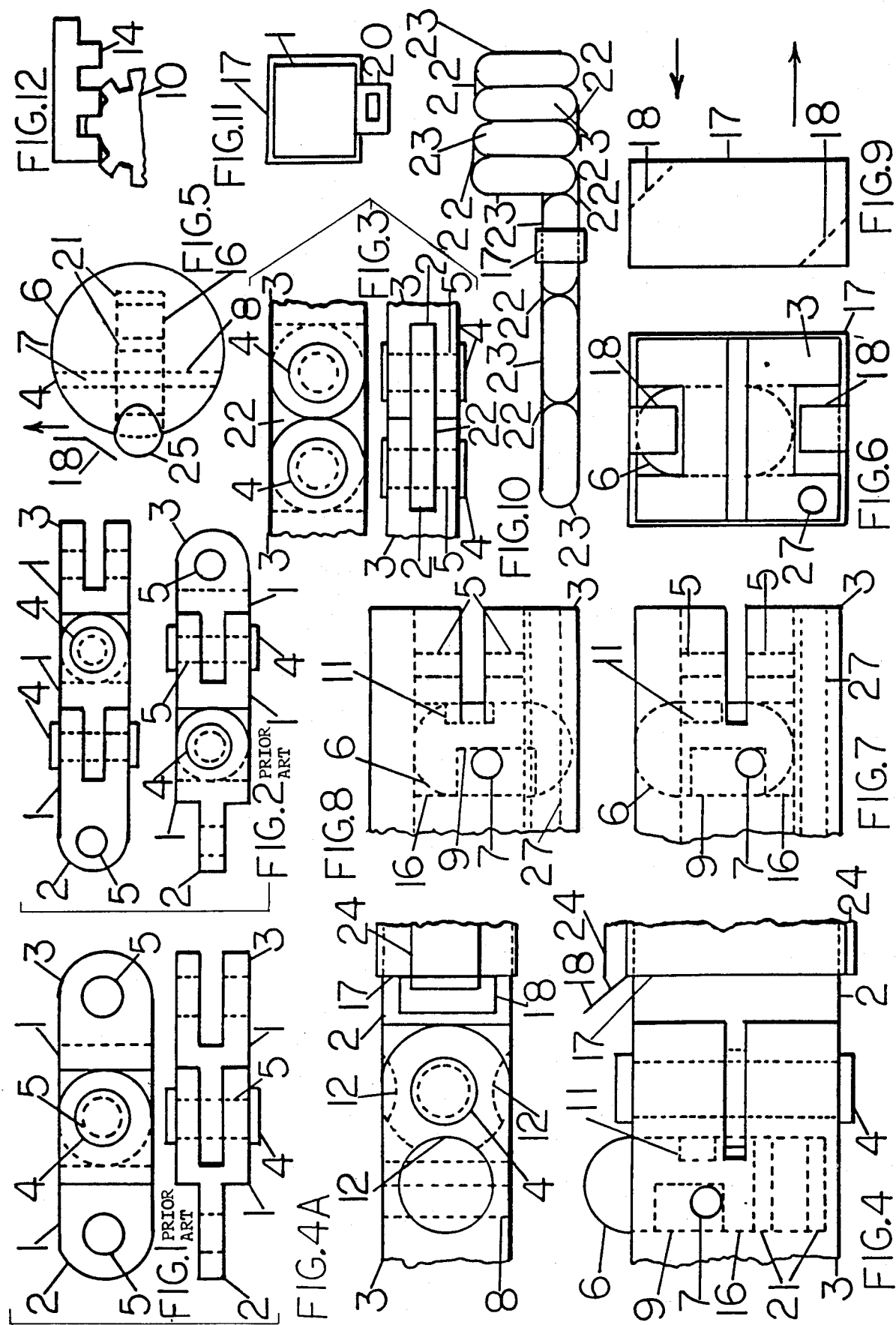

CHAINBAR

BACKGROUND OF THE INVENTION

One of the numerous problems that have long plagued manufacturers of items that fold or telescope into a compact size for easy storage or portability, is how to store long straight bars; and especially those of adjustible length.

One common method used, is to have consecutively smaller diameter, concentric tubes, that fit inside each other, with means for locking the tubes in an extended position, such as friction type collars or tabs. Because of the required overlap in tubes needed for structural strength, the outer tube contributes most to the extended length, while each consecutive inner tube contributes a consecutively smaller length. The problem is, that when this method is used in items, it results in a long thin unit, which is not very easy to store or carry, as would be an item, for example, having the same volume, but being only half as long.

Another example is a small, compact, folding luggage cart, that either expands and/or telescopes into a compact size for storage or portability. The resulting size is a long, wide, narrow shape; usually limited in width by the distance between wheels, in thickness by the diameter of the wheels, and the length by the folded height of the handle.

If a chainbar is used as the adjustable legs of a camera tripod, the resulting tripod may be made into a more compact size, since a chainbar may be folded into smaller lengths. There is also no loss in space, since a chainbar does not require an overlap between its parts, as do telescoping tube legs, except for an anchoring device at the body end of the tripod. The chainbar could be made of hollow metal or plastic links to conserve weight and material, relying on the inherent structural strength of hollow members. Also, since the stress of the chainbar is distributed over a series of linkages, it could support more weight than friction locking devices, and could be made in a tapered shape.

If a chainbar is used in the design of a small luggage cart, the chainbar can be folded into a compact body, and used as the adjustable length handle, while the wheels may be mounted at the ends of a chainbar that also folds into the body, and can be extended away from the body for an increased wheelbase. Also, hinged flaps mounted on the top of the body, could be extended away from the body to provide a larger platform on which to put the luggage.

Some of the numerous uses that chainbars may be put to, include; microphone or music stands, curtain or towel rods with hook holes at the bottom length of the chainbar from which curtains, flags, signs, etc., may be hung, tents, umbrellas; folding tables or stools, luggage bags, and toys, such as.

Note that the chainbar could be made quite large, and used in construction equipment, for example; and that the smaller the links, the more circular the shape that the chainbar may be made to be regid in.

With holes in the individual links, through which flexible steel cables or electric power cables could be put through, the chainbar may be used in robotics, with the use of magnetic means for placing the links in the regid position, instead of mechanical means.

PRIOR ART

Prior art consists of the following patents. U.S. Pat. No. 3,027,201 by W. J. Blazek, for a "Master Pin for Articulated Tracks", hereafter "Blazek"; U.S. Pat. No. 3,309,864 by C. J. Arndt for a "Flexible Link Connection", hereafter "Arndt"; U.S. Pat. No. 4,658,577 by Ernst Klein for a "Self-Supporting Cable Carrier", hereafter "Klein"; U.S. Pat. No. 1,004,575 by J. M. Jones for a "Chain", hereafter "Jones"; U.S. Pat. No. 2,417,141 by W.W. Syfert for a "Binder Post", hereafter "Syfert"; U.S. Pat. No. 774,470 by J. Hamilton & N. Lewis for a "Fire Escape", hereafter "Hamilton"; and U.S. Pat. No. 2,362,383 by L. Lendinara for "Flexible Joints", hereafter "Lendinara".

Blazek teaches the use of a removable, nonrotating, master pin for articulated tracks, in the form of a long, solid, circular cylinder. The cylinder has an annular, circular, center screw hole, with a second hole, at a right angle to the screw hole, going from the circular outside outside surface of the cylinder to the inner end of the screw hole. A small cylinder with a pointy end is inserted into the second hole, so that when a screw with a bevel end is screwed into the screw hole, it forces the pointy end of the small cylinder up against any mating surface and holds it in place, so that the cylinder may not move. A variation is mentioned, where a small cylinder with a rounded top fits into a hole in the mating surface.

Arndt, as an improvement over Blazek, teaches the use of a new method of holding a removable, rotating, solid hinge pin, in place. The hinge pin is in the shape of a long circular cylinder, and has an annular, circular, center hole along its length, going from one flat side to the other, with one end threaded for a screw. There is also a second hole, at the center of its length, at a right angle to center hole. Into this hole going from the circular outside surface of the cylinder to the center hole, a small cylinder is inserted which is a little longer than the hole. When a screw with a wedge or bevel shaped edge is screwed into the appropriate end of the annular hole, this raises the small cylinder beyond the outside surface hinge pin. The hinge pin with the small cylinder in place, is inserted into a hole common to two link ends to hold them together. One link end has two tabs between which the single tab of the remaining link end fits. The center of the link hole has a parallel groove around the circumference of the hole, and larger in diameter than the hole. The screw is installed into the threaded end of the center hole, and the small cylinder is forced into the groove, and keeps the hinge pin in place, while allowing it to rotate.

The above two patents illustrate two different methods for holding a hinge pin in place; and may be used instead of the simpler linkage pin (4) shown in FIGS. 1, 2, 3, and 4 of this patent.

Klein teaches the use of a self supporting cable carrier using a series of coupled links that will only bend in one direction along its length. Therefore, the device may be used to form a "U", with two arms and a semicircular bend, but again, only in one direction. If one end of the device is anchored in place, and formed into a "U", and if the free end is moved parallel to the end that is anchored in either direction, the semicircle will move while the free end will also move, but parallel to the anchored end, and for an amount limited by the length of the device.

The main difference between Klein and this instant patent is that Klein does not teach the use of a device having the characteristics of a chainbar. What is taught, is a device that has the characteristics of a rigid bar in one direction, and that of a flexible chain in the opposite direction.

Jones teaches the use of a "flat, link type chain", which may only bend in one direction. Therefore, if the chain is placed in a horizontal position with the appropriate side facing up; and lifted up, it will be a rigid bar. If placed with the opposite side up, it will become a flexible chain.

This device does not teach the use of a chainbar, but of a device that has the characteristic of rigidity in one direction, and that of a flexible chain in the other direction.

Syfert teaches the use of a series of links, used for holding pages in place, in a loose leaf binder; with one end permenantly attached to one cover of the binder; and the other end removably attached to the remaining cover. Each link may only bend for 45 degrees in one direction only, which will allow the loose leaf pages in the binder to lay flat when the binder is opened.

Syfert teaches the use of a device that has limited circular movement in one direction only, and not that of a chainbar.

Hamilton teaches the use of a "fire escape" device comprising a series of two types of links, which partially fit into each other, alternately connected together to form a length. When the links are placed in a horizontal position on a flat surface, and pushed together to form the shortest possible straight length, the device becomes a rigid bar. When the links are pulled out to form the longest possible straight length, the device becomes a flexible chain flexing in one direction only.

Hamilton teaches the use of a device that when compressed, becomes a rigid bar, and when expanded becomes a flexible chain that bends in one direction only, and not a chainbar.

Finally, there is the Lendinara patent, which teaches the use of a device described as "This invention relates to flexible joints and more particular to a joint designed for connecting the movable parts of lay figures such as mannequins and the like." The device described is for a new use of a "universal joint", invented in the year 1545 by an Italian professor, and has received wide use since then in all sorts of machines such as in cars and boats. It has been used in automobiles since their inception, and is known as a "universal".

Lendinara teaches the use of a series of links, held together by nuts and bolts, which are tightened in the desired position, and let loose to form a movable joint between links. While it is true that a universal joint, alone, or as described in Lendinara may be used to form a chainbar in very primative form, such use is not even hinted at in the Lendinara patent, even in the claims. To use Lendinara as a chainbar, as described in the claims would be impossible, since the use of pivot pins is cited, which unlike nuts and bolts, cannot be tightened to restrict the movement between adjacent links.

If the teachings of the figures of the Lendinara patent are used, they will form a primative chainbar, since the use of nuts and bolts are shown. However, to place this device in the opposite condition, such as from a rigid bar to a flexible chain; a screwdriver; and lots of time and patience; and an appropriate location with sufficient room and light, is needed, since each slotted head of each bolt that holds two links together would have to be loosened with the screwdriver. To place the the device in the rigid bar condition, is more difficult, since a wrench is needed as well, to hold the nut while the bolt is tightened with the screwdriver.

The main difference between Lendinara and this instant patent, is that this patent's chainbar, is easier and quicker to use, since if the chainbar is passed through a tube with a length of less than one link, in one direction it will immediately place the chainbar in the opposite state, and if passed through the same tube in the opposite direction, will place the chainbar in the original state. The same thing may be done manually, without the tube, but it will still be much faster than the Lendinara device.

SUMMARY OF THE INVENTION

The objects of this invention is to provide manually or mechanically operated chainbars that have the following advantages:

A device made up of a series of links that may be placed in a straight, regid bar, configuration; having a certain length and volume, which can be easily folded into an equal rectangular volume, one link thick, and the other dimensions being a fraction of the length of the regid bar configuration; or folded into an equal volume, cubic in shape, with its thickness being a multiple of the thickness of a link.

A device made up of a series of links, that may be placed in a generally circular regid configuration, having a certain volume and diameter; which may be easily folded into an equal volume, rectangular in shape, with each dimension being a fraction of the regid diameter.

A device made up of a series of links, stored in a folded condition in a hollow body with a tube through which the device is pulled out of the body, to form a regid bar, adjustible in one link increments; with or without a device attached to its extended end.

A folding device, that is easily adjustible in length, and just as easily folded.

A device consisting of a series of links, with means for connecting the links together, which allows movement between links, and with releasable locking means for restraining the movement of the links; and the addition of releasable locking means to lock the means for restricting movement.

A device made up of a series of links each having holes through which flexible cable could be passed, which may be placed in a regid position, or folded for storage.

A device made up of a series of links, each having hooks to which items may be attached, which may be extended into a regid bar.

GENERAL NOTES ABOUT THE DRAWINGS

Note that FIGS. 1 and 2 are not part of the invention, but are prior art, included by way of explination only.

In all of the FIGS. shown, and in the associated explanation, there are three types of links; male-female link (1), double male link (22), and a double female link (23). Each link has two ends, each of which may be either a male link end (2), or a female link end (3).

The male link end (2), as illustrated by the left side of both drawings of FIG. 1, consists of a single flat semicircular tab, with a linkage pin hole (5). The male link end (2) fits between the two semicircular tabs of the female link end (3), as illustrated by the right side of both drawings of FIG. 1. Both tabs of the female link end (3), like the male link end (2), also have a linkage pin hole (5).

A male link end (2) and a female link end (3) are held together by a linkage pin (4) through the linkage pin holes (5), as illustrated by the center portion of both drawings of FIG. 1. The two identical links of each drawing in FIG. 1, are of the male-female link (1) type, and can rotate for a distance of 180 degrees with respect to each other, with the center of the linkage pin (4) as an axis of rotation.

Note that the drawings are simplified, and the proportions exaggerated for clarity; and that the drawings should not misconstrued as limiting the scope of the invention in any way.

DESCRIPTION OF THE PREFERRED EMBODIMENTS

Referring specifically to the figures, in which identical or similar parts are designated by the numeral throughout.

FIG. 1 has a side view (lower drawing) and a top view (upper drawing), of a chain having two identical male-female links (1); each having a male link end (2) at the left side, and a female link end (3) at the right side. The links are held together by a linkage pin (4) through a linkage pin hole (5). One link may rotate with respect to the other through 180 degrees, with the center of the linkage pin (4) as an axis of rotation.

FIG. 2 has a side view (lower drawing) and a top view (upper drawing) of a chain having three identical male-female links (1); each having a male link end (2) at the left side, and a female link end (3) at the right side. However unlike the male-female link end (1) of FIG. 1, where the tabs of both the male link end (2) and the female link end (3) are in the same plane; the tabs of both type links of FIG. 2 are at right angles to each other, allowing the male-female links (1) to alternately rotate in the vertical and horizontal planes. The links are held together by linkage pins (4) through the linkage pin holes (5).

The type chain may be folded for storage in a multiple layer volume, with each layer, one link thick.

FIG. 3 has a side view (lower drawing) and a top view (upper drawing) of a chain having a double male link (22), having two male link ends (2) in the center, attached to two female link ends (3) by each end, by means of two linkage pins (4) through the linkage pin holes (5). While not shown, it is possible to have a double female link made up of two female link ends (3).

FIG. 4 has a side view (lower drawing) and a top view (upper drawing) of a female link end (3) at the left side of both drawings, and a male link end (2) at the right side of both drawings, held together by a linkage pin (4). In addition, FIG. 4 includes a bolt (6), that is held in place in a bolt shaft (16) by a bolt guide pin (7) in a bolt guide pin cutout (9). A bolt guide pin hole (8) holds the guide pin (7) in place. There are two magnets (21); one is attached to the bottom of the movable bolt (6) and the other to the bottom of the bolt shaft (16), with like magnetic poles facing each other. Since like magnetic poles repell each other, the magnetic force of the magnet (21) at the bottom of the bolt shaft (16) repells the magnet (21) at the bottom of the bolt (6) and pushes the bolt (6) upwards so that the top of the bolt (6) protrudes past the top of the female link end (3), until it can go no further in the bolt guide cutout (9), being stopped by the bolt guide pin (7). As shown best by the upper drawing, in dashed lines, the tab of the male link end (2) can have three link position cutouts (12); an upper and lower one, and a center one at the left. As shown by both drawings, the bottom of the bolt (6) fits into the left center link position cutout (12), holding it in place, and not allowing the male link end (2) to rotate with the center of the linkage pin (4) as the axis of rotation.

Therefore, if a chain is made up of a series of male-female links (1) such as those shown in FIG. 1, each having a bolt (6) and the associated parts in the corresponding position shown at the left of both drawings of FIG. 4, the result would be a straight regid bar. The bolt (6) of FIG. 4 also has a linkage release cutout (11), and if in the bottom drawing, the bolt (6) is pushed downward until the linkage release cutout fits around the tab of the male link end (2), the tab is released and is able to rotate with the center of the linkage pin (4) as the axis of rotation.

Also shown is a rectangular tube (17) which has a tube guide (18) and two linkage pin guides (24), and which fits around the male link end (2). If in the bottom drawing, the links are pushed to the right towards the tube (17), the top and bottom of the linkage pin (4) fits into the linkage pin guides (24). Then the top of the bolt (6) will reach the tube guide (18) and begin to be pushed downward, till reaching the point where the linkage release cutout (11) fits around the tab of the male link end (2), releasing the male link end (2) and allowing it to rotate with the center of the linkage pin (4) as the axis of rotation.

Therefore, if a chain made up of male-female links (1), such as those shown in FIG. 1, each having a bolt (6) with the associated parts shown at the left of both drawings of FIG. 4; is pushed through the rectangular tube (17), which has linkage pin guides (24) and a tube guide (18), and the length of the rectangular tube (17) is in the shape of a straight and/or circular path, the chain will follow the path of the length of the tube (17) and can be stored in this manner in the tube (17). As the links are pulled out of the tube (17), the links will once more become rigid, one link at a time, as the bolt (6) is released, and form a straight regid bar.

Note that as shown in the top drawing of FIG. 4, the tab of the male link end (2) also has two other link position cutouts (12), and if desired, may be locked in one of these positions, by pushing downwards on the bolt (6) and rotating the link to the desired link position cutout (12) and the bolt (6) released to lock the link in place.

FIG. 4, lower drawing, includes a side view of the hemispherical top of the bolt (6); while the upper drawing includes a top view, of the top of the same bolt (6), which is in the shape of a circle, and although not specifically identified for clarity, may be found directly between number "(12)" located at the top left of the drawing, and number "(4)" located at the bottom left of the drawing.

FIG. 5 shows a top view of the hemispherical top of the same bolt (6) as previously described and located in both drawings of FIG. 4; with the rest of the upper drawing of FIG. 4 omitted for clarity; and with a safety bolt (25) and associated parts installed.

FIG. 5 shows a safety bolt (25), in a bolt shaft (16); a bolt guide pin (7) in the bold guide pin hole (8) having two identical open ends (4) of which only the top one is identified for clarity; and two magnets (21) with like magnetic poles facing each other. Also shown is a tube guide (18) with a direction arrow pointing upwards.

Note that the safety bolt (25) is smaller in size than the bolt (6) shown best in side view in the bottom drawing of FIG. 4, and identical in shape, except that it has no linkage release cutout (11), since it is not needed.

The purpose of the safety bolt (25) is to prevent the bolt (6) from being accidentally moved, and allow movement between connecting links which could cause damage to associated equipment and/or hurt people using same. For example, in the bottom drawing of FIG. 4, if sufficient downward pressure is applied to the top of the bolt (6), this will allow movement, as previously explained, between the male link end (2), and the female link end (3).

As further shown in FIG. 5, a circular bolt shaft (16) and a circular guide pin hole (8), having two identical open ends (4) of which only the top one is shown: were added to the top of the bolt (6). A magnet (21) was installed at the bottom of the bolt shaft (16).

One end of the safety bolt (25) has a magnet (21) attached. The magnetic pole of the magnet (21) at the end of the safety bolt (25) is the same type, as the magnetic pole of the magnet (21) in the end of bolt shaft (16) that it faces; and since like magnetic poles repel each other, there will be a force pushing the safety bolt (25) to the left; placing it in the position shown.

The safety bolt (25) also has a guide pin cutout (number (9) in the bottom drawing of FIG. 4) but not identified for clarity. It is represented by two vertical dashed lines, which from left to right in FIG. 5, are the first and third dashed lines between the two horizontal dashed lines. Note that the complete third vertical dashed line also represents an edge of the bolt guide pin (7) and of the bolt guide pin hole (8).

The safety bolt (25) was inserted into the bolt shaft (16), with the guide pin cutout (not identified) as previously described, in the only correct position possible, that will allow the bolt guide pin (7) to be completely inserted through the end (4) to hold the safety bolt (25) in place. The magnetic repelling force between the two magnets (21) places the safety bolt (25) in the position shown; with the left end of the safety bolt (25) protruding out from the side of the hemispherical top of the bolt (6) as shown, preventing the top of the bolt (6) from being accidentally pushed down.

Also shown in FIG. 5 is a tube guide (18) with a direction arrow pointing upwards. If the bolt (6) is moved in the direction of the arrow, the end of the safety bolt (25), which protrudes from the left side of the top of the bolt (6), so that it comes into contact with the tube guide (18) and is pushed towards the right against the repelling force of the magnets (21), into the top of the bolt (6); this will now allow the top of the bolt (6) to be pushed down intentionally, either manually, or by another properly positioned tube guide, similar to tube guide (18).

FIG. 6 is a simplified front view of a female link end (3), with a bolt (6), inside of a rectangular tube (17) which has two tube guides (18). It also has a wire hole (27) through which flexible wire or cable may be passed from link to link. The flexible wire may be used as a means of transferring electrical power and/or signals between items at both ends of the chainbar, while the flexible cable may be used to provide a mechanical linkage between same.

FIG. 7 is a simplified side view of the female link end (3) of FIG. 6, having a bolt (6), which is held in place in the bolt shaft (16) by the bolt guide pin (7), allowing it to move the length of the bolt guide cutout (9). The linkage release cutout (11) is above the slot of the female link end (3), and if a male link end (2), such as shown in FIG. 4 were attached to the female link end (3) by a linkage pin (4), through the linkage pin hole (5), it would be locked in the regid straight position. There is also the wire hole (27).

FIG. 8 is an identical, simplified side view of FIG. 7, with the identical parts called out; except it is shown with the bolt (6) in the lower position, which would place the linkage release cutout (11) around the slot of the female link end (3) and would unlock a male link end (2) if it were attached, as in FIG. 4; and allow it to rotate.

FIG. 9 is a side view of the tube (17) shown in a front view in FIG. 6, showing the location of the two tube guides (18).

If a female link end (3) of FIG. 8 is passed through the tube (17) of FIG. 9, in the direction of the upper larger arrowhead with the shorter line, the bottom tube guide (18) would push the bolt (6) up into the position shown in FIG. 7.

Conversely, if the female link end (3) of FIG. 7 is passed through the tube (17) of FIG. 9, in the direction of the lower smaller arrowhead with the longer line, the upper tube guide (18) would push the bolt (6) down into the position shown in FIG. 8.

It may therefore be seen that a tube (17) such as that shown in FIG. 9, which may be less than one link long; may be used to place a series of links, such as those shown in FIGS. 6 or 7, in or out of the regid straight bar condition, one link at a time.

FIG. 10 is a simplified top view of a thirteen link chain made up of six double male links (22) and seven double female links (23), and a tube (17); of the type shown in FIGS. 6 through 9. A tube (17), which is less than one link long, is shown around a double female link (23).

FIG. 10 shows how links on the left side of the tube (17), having passed through the tube (17) in a direction to the left, are in an extended regid straight bar condition; while on the right side, the links are flexible like a chain and may be folded and stored in a volume, one layer thick, which is equal to the thickness of a single link.

FIG. 11 is a simplified front view of rectangular male-female link end (1) inside of a slightly larger, rectangular tube (17), which has a cutout at its bottom, to allow the hook hole (20) attached to the bottom of the male-female link (1) to protrude. Hooks may be used to hang items from the hook hole (20) such as curtains, dividers, flags, etc.

Instead of a hook hole (20), a gear track (14) as shown in FIG. 12, may be used instead, and may be driven either manually or mechanically through a gear (10). In FIG. 11, compressed air and/or a vacuum may be used to push or pull the male-female link (1) through a tube (17).

It is to be understood that the foregoing descriptions of the preferred embodiments of the invention illustrated herein, are only exemplary of this instant invention, and various modifications to these embodiments shown may be made without departing from the spirit and scope of this invention.

What is claimed is:

1. A chain bar of adjustable rigid length, comprising at least first and second links; means for hinging said first link to said second link; said means for hinging being operable for permitting said hinging to occur about an axis; mechanical means in said first link, immediately movable upon activation, from a first position into a second position and from said second position into said first position, so that in said first position, said mechanical means locking said first and second links in at least one fixed angle relative to the other about said axis; and in said second position, unlocking said first and second links and allowing free rotation therebetween; whereby said mechanical means further includes a sliding bolt which when in said first position, meshes with an indentation in said second link; and when in said second position, is free of said indentation.

2. A chain bar of adjustable rigid length, comprising at least first and second links; means for hinging said first link to said second link; said means for hinging being operable for permitting said hinging to occur about an axis; mechanical means in said first link, immediately movable upon activation, from a first position into a second position and from said second position into said first position; so that in said first position, said mechanical means locking said first and second links in at least one fixed angle relative to each other about said axis; and in said second position, unlocking said first and second links and allowing free rotation therebetween; said mechanical means further includes a sliding bolt which when in said first position, meshes with an indentation in said second link; and when in said second position, is free of said indentation; and releasable locking safety means to prevent activation of said mechanical means.

3. A chain bar of adjustable rigid length, comprising a plurality of links, with hinge means for hinging said links in sequence; said hinge means being operable for permitting said hinging to occur about an axis; mechanical means in alternate said links, movable upon activation from a locking position to an unlocking position and from said locking position to said unlocking position; and when in in said locking position, said mechanical means preventing movement between adjacent said links, and in said unlocking position, permitting said movement between said adjacent links; whereby said mechanical means includes sliding bolts which, when in said locking position, mesh with indentations in said adjacent links, and when in said unlocking position, said sliding bolts are free of said indentations.

4. A chain bar of adjustable rigid length, comprising a plurality of links, with hinge means for hinging said links in sequence; said hinge means being operable for permitting said hinging to occur about an axis; mechanical means in alternate, said links, movable upon activation, from a locking position to an unlocking position and from said locking position to said unlocking position, whereby in said locking position, said mechanical means preventing movement between adjacent said links, and in said unlocking position, permitting said movement between adjacent said links and allowing free rotation therebetween; whereby said mechanical means includes a sliding bolt which when in said locking position, meshes with an indentation in said adjacent link; and when in said unlocking position, is free of said indentation; with the addition of releasable safety locking means to prevent said activation of said mechanical means.

5. A chain bar of adjustable rigid length, comprising at least first and second links; means for hinging said first link to said second link; said means for hinging being operable to occur about an axis; mechanical means capable of being placed in a locked and unlocked position so that in said locked position, said mechanical means locking said first and second links in at least one fixed angle relative to each other about said axis; and in said unlocked position, unlocking said first and second links allowing free rotation therebetween; whereby said mechanical means includes a sliding bolt, which when in said locked position, has increased contact area between said first and second links preventing rotation therebetween; and when in said unlocked condition, has decreased said contact area between said first and second links allowing said rotation therebetween.

6. The chain bar as defined in claim 5, with the addition of releasable safety locking means to prevent said mechanical means from being placed in said unlocked position.

* * * * *